(12) United States Patent
Guste (10) Patent No.: US 9,316,401 B1
(45) Date of Patent: Apr. 19, 2016

(54) GRILL FIREPLACE UNIT

(76) Inventor: Henry Guste, New Orleans, LA (US)

( * ) Notice: Subject to any disclaimer, the term of this patent is extended or adjusted under 35 U.S.C. 154(b) by 923 days.

(21) Appl. No.: 13/411,184

(22) Filed: Mar. 2, 2012

(51) Int. Cl.
*F24C 15/18* (2006.01)

(52) U.S. Cl.
CPC .................................. *F24C 15/18* (2013.01)

(58) Field of Classification Search
CPC ............ F24C 11/00; F24C 15/18; F24C 3/00; A47J 37/07; A47J 37/074; A47J 37/0713
USPC ........... 126/1 E, 4, 14, 25 R, 29, 30; 137/883, 137/905; 251/205, 208, 209
See application file for complete search history.

(56) References Cited

U.S. PATENT DOCUMENTS

| | | | | |
|---|---|---|---|---|
| 2,043,106 A * | 6/1936 | Lange | ................... | F16K 27/045 137/556 |
| 2,742,892 A * | 4/1956 | Herzer | ................ | A47J 37/0754 110/190 |
| 3,140,740 A * | 7/1964 | Lagreid | ................... | F21S 13/12 126/44 |
| 3,174,473 A * | 3/1965 | Swanstrom, Sr. | ....... | A47J 37/06 126/25 R |
| 3,566,917 A * | 3/1971 | White | .......................... | 137/883 |
| 3,804,118 A * | 4/1974 | Love et al. | .................... | 137/883 |
| 3,805,762 A * | 4/1974 | Nelson | .......................... | 126/506 |
| 4,088,436 A * | 5/1978 | Alferes | .................. | F16L 37/23 137/517 |
| 4,089,258 A * | 5/1978 | Berger | ............................. | 99/339 |
| 4,190,082 A * | 2/1980 | Hernandez Crespo | . | F16K 11/00 137/625.17 |
| 4,241,761 A * | 12/1980 | Miller | .......................... | 137/883 |
| 4,498,500 A * | 2/1985 | Miller | ........................... | 137/883 |
| 4,573,905 A * | 3/1986 | Meyers | ......................... | 431/125 |
| 4,782,861 A * | 11/1988 | Ross | ....................... | F17C 13/04 137/505.38 |
| 5,027,787 A * | 7/1991 | Gorton | .................... | F24C 3/128 126/21 R |
| 5,165,450 A * | 11/1992 | Marrelli | ................ | F16K 11/052 137/118.01 |
| 5,327,879 A * | 7/1994 | Ferraro | ............... | A47J 37/0786 126/39 E |
| 5,483,947 A * | 1/1996 | Giebel et al. | ................. | 126/41 R |
| 5,536,518 A * | 7/1996 | Rummel | ........................ | 426/523 |
| 5,694,917 A * | 12/1997 | Giebel et al. | ................. | 126/41 R |
| D396,166 S * | 7/1998 | Pavlich | ........................ | D7/333 |
| 5,782,230 A * | 7/1998 | Linnebur et al. | ............ | 126/41 R |
| 5,786,045 A * | 7/1998 | Gerth | ....................... | B44F 9/02 156/60 |
| 5,795,145 A * | 8/1998 | Manning et al. | .............. | 431/280 |
| 5,829,425 A * | 11/1998 | Woods et al. | ............... | 126/39 E |
| 5,836,296 A * | 11/1998 | Hillis et al. | ................. | 126/39 G |
| 5,851,110 A * | 12/1998 | Ridenour | ...................... | 431/278 |
| 5,860,410 A * | 1/1999 | Hollingsworth, Jr. | .......... | 126/40 |
| 6,065,467 A * | 5/2000 | Martin | ........................ | 126/41 R |
| 6,192,881 B1 * | 2/2001 | Nix | ...................... | F24B 1/1808 126/39 R |
| 6,237,638 B1 * | 5/2001 | Asta et al. | ..................... | 137/883 |
| 6,340,034 B1 * | 1/2002 | Arnott et al. | .................. | 137/883 |
| 6,363,971 B1 * | 4/2002 | Kaylan et al. | ................ | 137/883 |
| 6,408,882 B1 * | 6/2002 | Smith, Jr. | ................ | F16K 11/07 137/625.13 |
| D460,893 S * | 7/2002 | Rowe | ............................ | D7/334 |
| 6,595,197 B1 * | 7/2003 | Ganard | ........................ | 126/25 R |
| 7,600,536 B1 * | 10/2009 | Steininger | ............... | F16L 41/03 137/882 |
| 8,104,513 B2 * | 1/2012 | Furukawa | .............. | G01N 30/38 137/806 |
| 8,127,757 B1 * | 3/2012 | Bourgeois | ................... | 126/25 R |
| 2002/0160325 A1 * | 10/2002 | Deng | .............................. | 431/76 |
| 2002/0160326 A1 * | 10/2002 | Deng | .............................. | 431/79 |
| 2003/0188735 A1 * | 10/2003 | Yang | .............................. | 126/519 |

(Continued)

*Primary Examiner* — Jorge Pereiro
(74) *Attorney, Agent, or Firm* — Jessica C. Engler; Russel O. Primeaux; Kean Miller LLP (57) ABSTRACT

A unit for grilling or enjoying the aesthetic qualities of a fireplace where the grilling portion of the unit is located above the fireplace portion of the unit, and above the grilling portion is a hood portion for containing heat near the grilling portion.

2 Claims, 11 Drawing Sheets

(56) References Cited

U.S. PATENT DOCUMENTS

| | | | |
|---|---|---|---|
| 2003/0213484 A1* | 11/2003 | Alden et al. | 126/41 R |
| 2004/0149144 A1* | 8/2004 | Qubeka | 99/450 |
| 2005/0121018 A1* | 6/2005 | Rosen | F24B 1/182 126/9 R |
| 2006/0054156 A1* | 3/2006 | Zelek et al. | 126/25 R |
| 2006/0057520 A1* | 3/2006 | Saia et al. | 431/281 |
| 2006/0147861 A1* | 7/2006 | Czajka | F24C 3/103 431/278 |
| 2006/0213496 A1* | 9/2006 | Kimble et al. | 126/39 N |
| 2007/0235020 A1* | 10/2007 | Hills et al. | 126/512 |
| 2009/0145421 A1* | 6/2009 | Yufer | A47J 37/0713 126/25 R |
| 2011/0120442 A1* | 5/2011 | Duncan | 126/25 R |

* cited by examiner

GRILL FIREPLACE UNIT

BACKGROUND OF THE INVENTION

I. Field

The invention belongs to the field of art of gas-powered outdoor cooking grills and fireplaces, specifically a unit designed for home or consumer use which can function as a grill and a fireplace.

II. Background

Traditional gas-powered outdoor grilling devices are well known in the art, and are very popular for outdoor cooking. These outdoor grilling devices typically include a horizontally disposed rack which is placed directly above the gas-powered flames for cooking. In these types of traditional units, the heat source is encased by the bottom grill base and the horizontally disposed grill is further covered by a hood in order to trap heat and cook food placed on the grill. Thus, in this configuration the flames serve the purpose of heating and cooking the food on the grill, but the flames provide no aesthetic appeal.

Gas-powered outdoor fireplaces are also known in the art, and are generally used to provide heat and/or to provide aesthetic appeal. They are usually crafted to look like a wood-burning fireplace, including fake logs, but offer the conveniences of a gas-powered fireplace, such as the easy start of the fire and the lack of clean-up of wood and ash afterwards. However, these outdoor fireplaces generally do not offer a means for cooking or grilling food. Specifically, they are not equipped with a cooking surface, such as a horizontally disposed rack, means for controlling the intensity of the gas flames or a means for trapping heat to further aid in cooking the food. As such, these gas-powered outdoor fireplaces, while offering the aesthetic appeal of a fire, are not useful for cooking purposes.

The present invention combines the advantages of a gas-powered grill and a gas-powered fireplace to enable the user to use a single unit to cook food and to also enjoy an aesthetically pleasing outdoor fire. Further, the unit includes wheels on its base so that it can be moved to a location the user desires. Additionally, the present invention is further capable of utilizing the heat produced by the fireplace portion of the unit to cook or warm food located in the grill portion of the unit, and may also include various safety mechanisms to ensure the user is not harmed when using the unit.

SUMMARY OF THE INVENTION

The present invention provides an outdoor grill and fireplace in a single unit wherein a fireplace assembly is disposed below a grill assembly. A further aspect of the present invention is an outdoor grill and fireplace combined in a single unit comprising a gas source providing a flow of gas, a main gas line, a directional valve, a plurality of burner arms and a burner tube. In this aspect of the present invention, the directional valve is connected to the gas source by the main gas line and is capable of directing the flow of gas from the main gas line to either the plurality of burner arms or the burner tube.

The features and advantages of the present invention will be readily apparent to those skilled in the art. While numerous changes may be made by those skilled in the art, such changes are within the spirit of the invention.

BRIEF DESCRIPTION OF THE DRAWINGS

For a further understanding of the nature and objects of the present invention, reference should be had to the following description taken in conjunction with the accompanying drawings in which like parts are given like reference numerals.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

Figure 1:
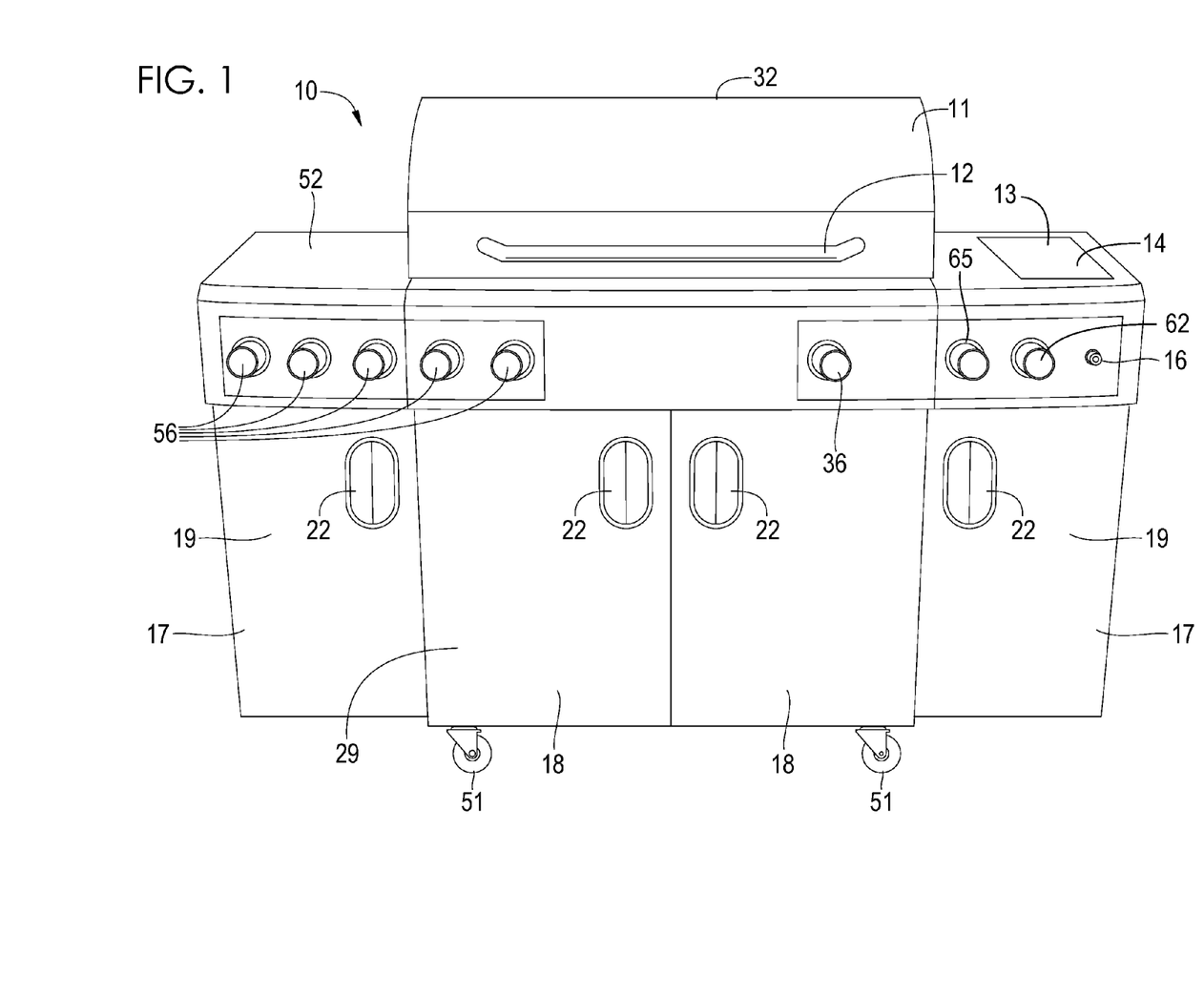
FIG. 1 is a front view of the grill fireplace unit in accordance with an embodiment of the present invention.
Figure 2:
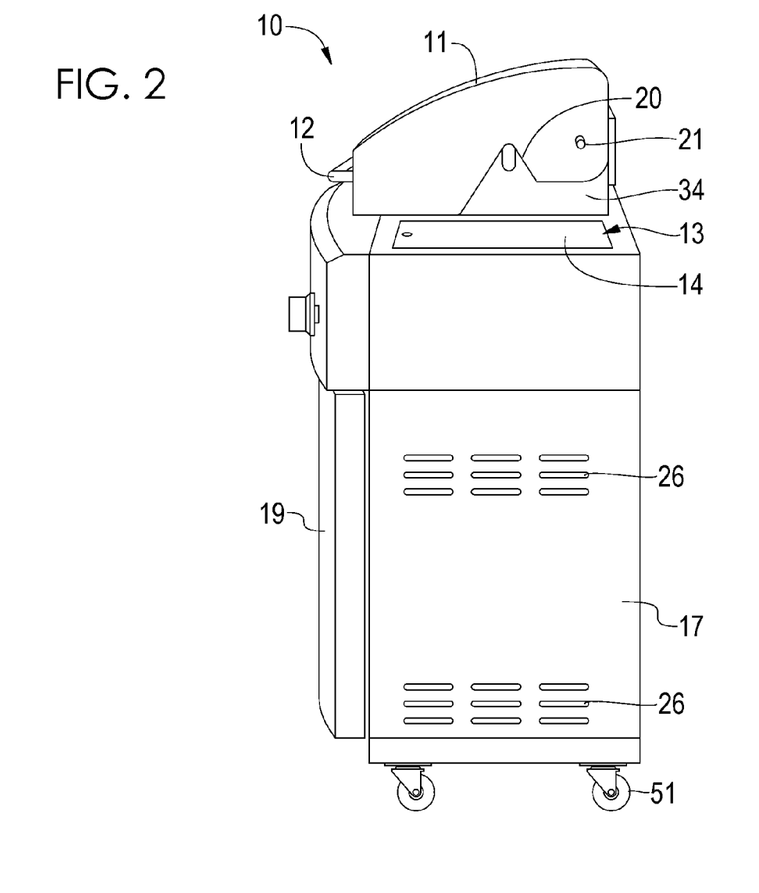
FIG. 2 is a side view of the grill fireplace unit in accordance with an embodiment of the present invention.
Figure 3:
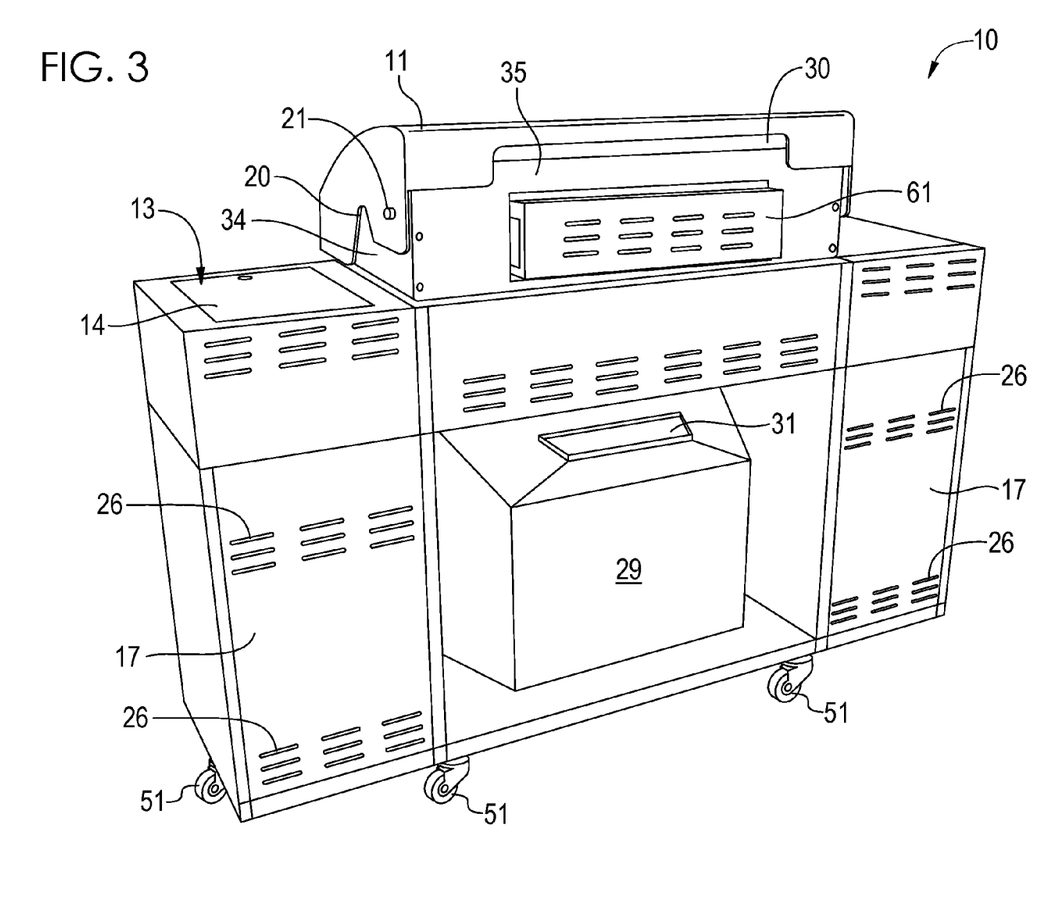
FIG. 3 is a rear view of the grill fireplace unit in accordance with an embodiment of the present invention.
Figure 4:
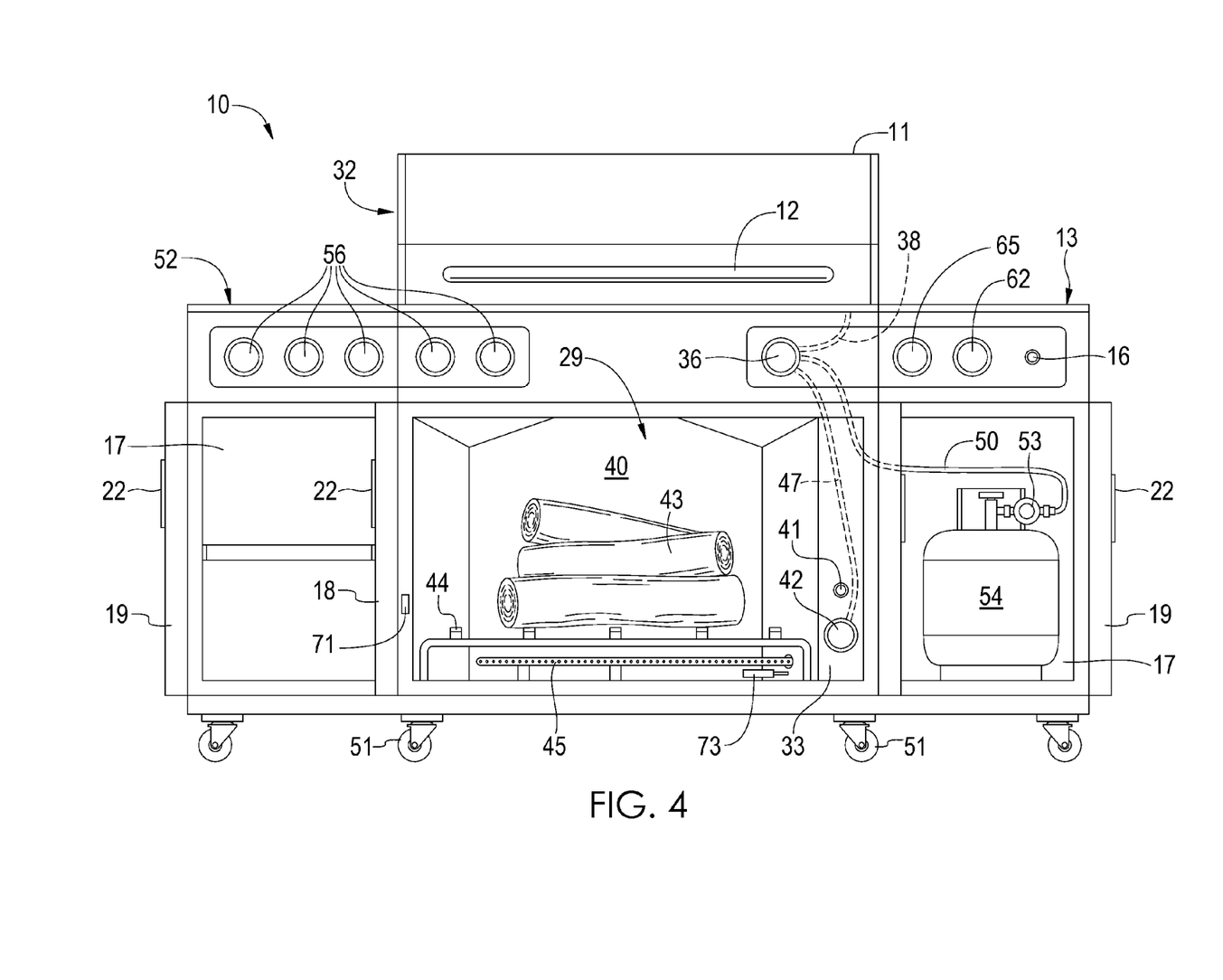
FIG. 4 is a front view of the grill fireplace unit in accordance with an embodiment of the present invention wherein the interior of the cabinets and the fireplace interior are shown.

Now turning to the figures, FIGS. 1-5 of the drawings illustrate a gas-powered grill fireplace unit 10. The grill fireplace unit 10 comprises a grill assembly 27, and below the grill assembly 27, a fireplace assembly 29. As an additional option, the grill fireplace unit 10 may further comprise a hood assembly 32 which covers the grill assembly 27. The hood assembly 32 serves to contain heat and hot air when the grill assembly 27 is in use, and also to protect the grill assembly 27 when the grill fireplace unit 10 is not being used. The fireplace assembly 29 may further include cabinets 17 on either side of the fireplace assembly 29 with cabinet doors 19 and door handles 22. As can be seen in FIG. 4, the cabinets 17 can house a gas tank 54, grilling accessories or other items (not shown), and may also include shelves to aid in storing items (not shown). The cabinets 17 also include cabinet vents 26, as seen in FIGS. 2 and 3, that allow heat or moisture to escape from the cabinets 17. Further, the tops of the cabinets 17 may comprise a worktop 52 for holding food, dishes or grilling accessories.

Figure 5:
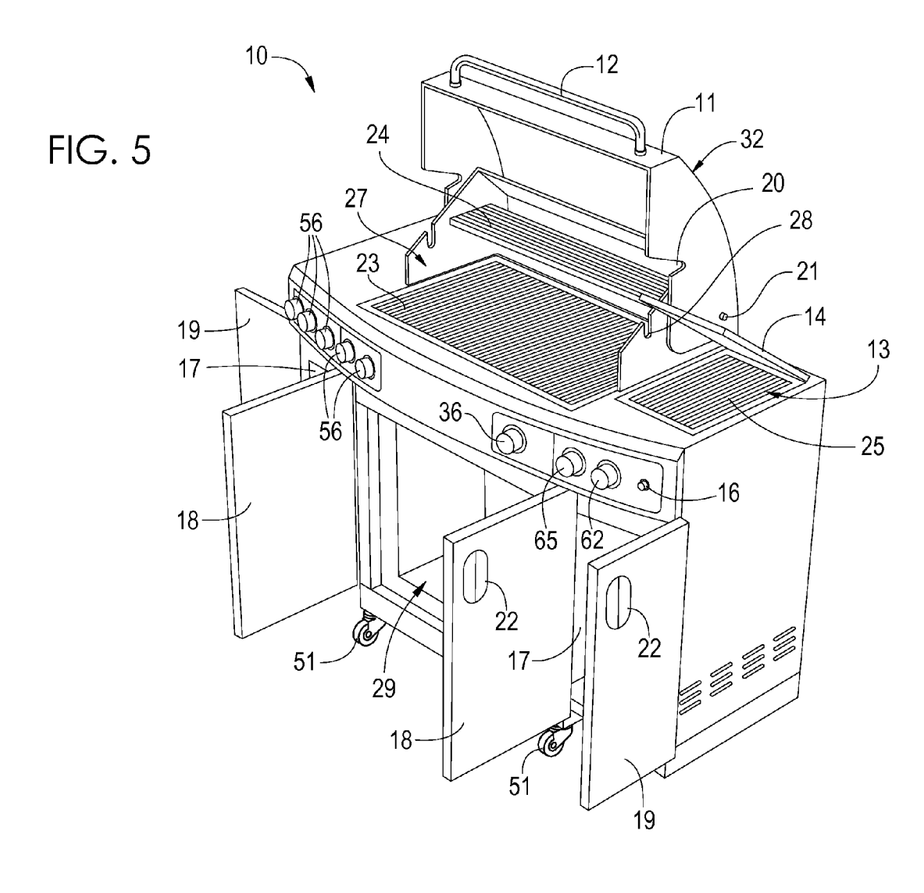
FIG. 5 is a perspective view of the grill fireplace unit in accordance with an embodiment of the present invention wherein the grill assembly and side burner assembly are shown.

As can be seen in FIGS. 1, 4, and 5, the grill fireplace unit 10 includes a grill ignition switch 16, a directional gas control knob 36, at least one grill control knob 56, a main infrared burner control knob 65 and a side infrared burner control knob 62 that are placed either above or near the cabinets 17, so that they are away from the path of hot air that may rise from the fireplace assembly 29 when in use. Additionally, the aforementioned knobs are placed above or near the cabinets 17 to provide a pleasurable view of the fireplace assembly 29, and so that the fireplace better resembles a traditional indoor fireplace.

The directional gas control knob 36 is connected to a directional valve 37, where the directional valve 37 may be a standard manual gas control valve. The directional valve 37 is further connected to a main gas line 50 and a gas tank 54 or an alternative gas source (such as a residential natural gas line). The directional gas control knob 36 is in communication with and controls the directional valve 37, and is capable of controlling the directional valve 37 to allow it to direct gas through the grill gas line 38 and to the grill assembly 27 or through the fireplace gas line 47 and to the fireplace assembly 29. The directional valve 37 thus prevents the use of the grill assembly 27 and the fireplace assembly 29 at the same time for safety purposes.

As best shown in FIGS. 2, 3 and 4, the hood assembly 32 is comprised of a hood top 11 pivotally connected to each of two hood sides 34 via hood hinges 21. The two hood sides 34 are further connected to a hood back 35. Furthermore, as can be seen in FIG. 3, the back of the hood top 11 includes a grill exhaust 30 that allows excess heat to escape from the hood assembly 32 when the hood top 11 is closed. The hood top 11 also comprises a hood handle 12 used for opening and closing the hood top 11. As seen in FIG. 5, each of the hood sides 34 also includes a hood side notch 28 so that a rotisserie attachment (not shown) for rotisserie-style grilling can be placed above the grill assembly 27. The hood top 11 also comprises two hood notches 20 that allow the hood top 11 to be shut around a rotisserie attachment if said rotisserie attachment is being utilized. Further, as seen in FIG. 5, attached to the interior of the hood sides 34 is an upper rack 42 that can be used to support food while it is being cooked or warmed.

Figure 7:
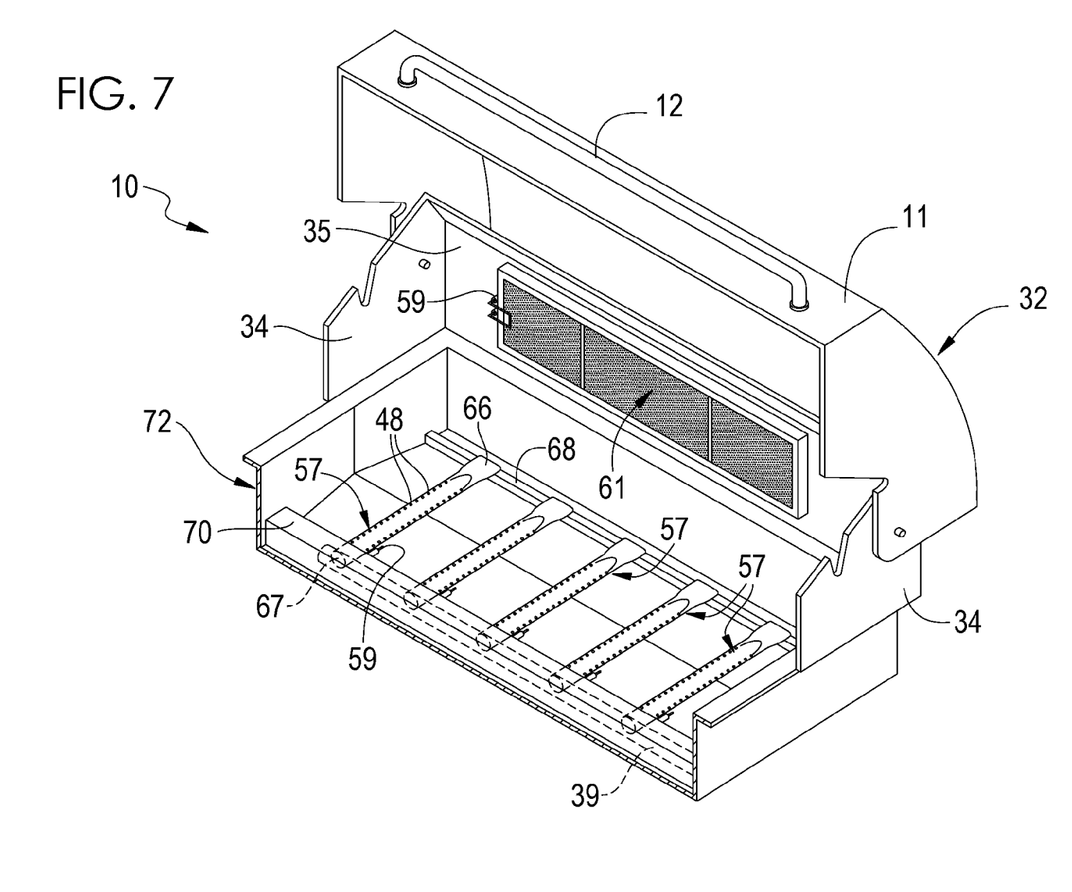
FIG. 7 is a view of the grill interior of the grill fireplace unit in accordance with an embodiment of the present invention wherein the main rack has been removed.

The grill assembly 27, as shown in FIGS. 5 and 7, comprises a main rack 23 for supporting food thereon while cooking. Underneath the main rack 23 is a grill base 72, and disposed within the grill base 72 are burner arms 57, as best seen in FIG. 7. The burner arms 57 each comprise a plurality of spaced apertures 48. In the embodiment shown in FIG. 7, five burner arms 57 are shown. However, the grill assembly 27 may comprise more or fewer burner arms 57. Each burner arm 57 has a first end 66 and a second end 67, wherein the first end 66 is flattened. Each flattened first end 66 of the burner arms 57 is connected to a longitudinal brace 68 that secures the burner arms 57 to the grill base 72. The second end 67 of each burner arm 57 comprises an igniter 59 for igniting the gas and creating flames. The igniter 59, may be of any type commonly used for gas grills, including a piezo electric igniter.

Figure 10:
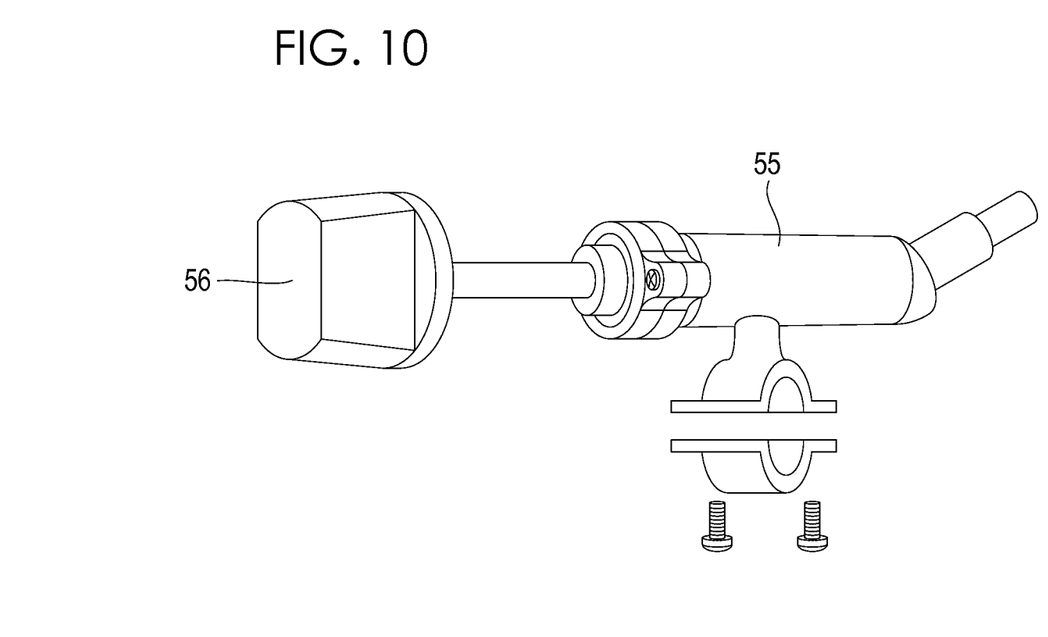
FIG. 10 is an illustration of a gas grill control valve connected to a gas grill control knob.

Further, the second end 67 of each of the burner arms 57 is connected to a grill control valve 55 wherein each grill control valve 55 is in communication with and controlled by a grill control knob 56. The grill control valves 55 may be standard manual gas control valves. A grill control valve 55 connected to a grill control knob 56 is shown in FIG. 10, however the connection between the grill control valve 55 and the grill control knob 56 may be longer or shorter depending on the configuration of the grill fireplace unit 10. Additionally, the grill control valve 55 shown in FIG. 10 is representative of the directional valve 37, main infrared control valve 64 (described below), side infrared control valve 63 (described below) and the fireplace control valve 49 (described below) and wherein the grill control knob 56 of FIG. 10 is also representative of the corresponding directional control knob 36, main infrared burner control knob 65 (described below), a side infrared burner control knob 62 (described below), and fireplace control knob 42 (described below).

In the embodiment shown in FIG. 7, the igniters 59 of each of the burner arms 57 are controlled by the single grill ignition switch 16. The second end 67 of the burner arms 57 are contained within a housing 70 to protect these elements. A gas manifold 39 connects each of burner arms 57, and the corresponding grill control valves 55, to a grill gas line 38 that brings gas to the grill assembly 27.

Figure 9:
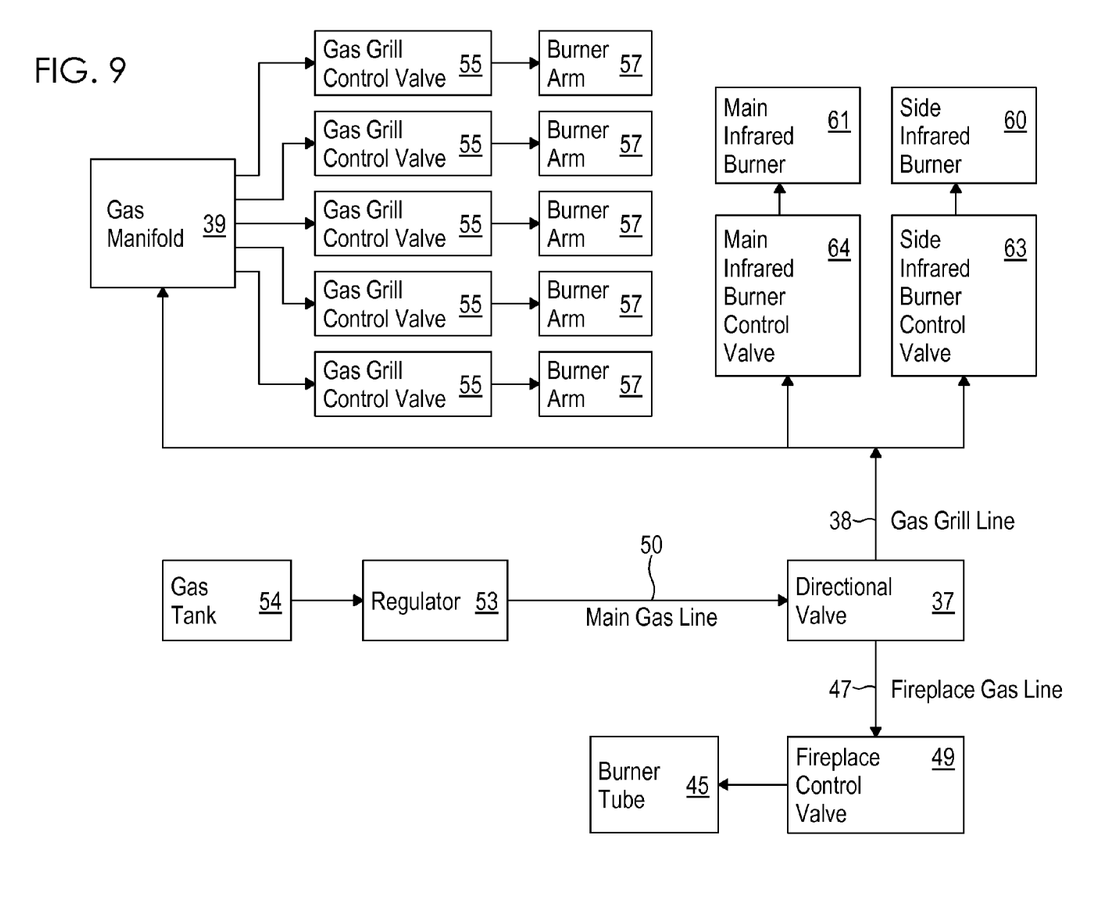
FIG. 9 is a schematic illustration of the gas flow and control valves in accordance with an embodiment of the present invention.

To operate the grill assembly 27 (as best illustrated in the schematic of FIG. 9) the user first engages the regulator 53 of the gas tank 54 or the residential natural gas line to allow gas to flow through the main gas line 50. The user then engages the directional gas control knob 36 that communicates with the directional valve 37 to direct gas through the grill gas line 38 to the gas manifold 39. Next, the user engages the grill control knobs 56 for the burner arms 57 the user wishes to use. The grill control knobs 56 communicate with the corresponding grill control valves 55 to allow gas to flow from the gas manifold 39 to the corresponding burner arms 57. The user then further engages the grill ignition switch 16 to activate the igniter 59 for each burner arm 57 which results in the production of flames extending from the apertures 48 of the burner arms 57. The user is then able to control the intensity of the flame produced by each burner arm 57 by further engaging the grill control knobs 56.

As best viewed in FIG. 7, attached to the interior of the hood back 35 is a main infrared burner 61 to be used for searing the food being cooked within the grill assembly 27. The use of infrared burners in gas grills is known in the industry, and works by focusing the flame of a standard gas burner onto a ceramic tile that has thousands of microscopic holes. This converts the heat of the flame into infrared energy. The main infrared burner 61 of the present invention comprises an igniter 59, such as a piezo electric igniter, connected to the grill ignition switch 16. The main infrared burner 61 is connected to a main infrared burner control valve 64, and is in communication with and controlled by a main infrared burner control knob 65. The main infrared burner control valve 64 may be a standard manual gas control valve.

To operate the main infrared burner 61, and as best illustrated in the schematic of FIG. 9, the user first engages the regulator 53 to allow gas to flow from the gas tank 54 or the residential natural gas line through the main gas line 50. The user then engages the directional gas control knob 36 that communicates with the directional valve 37 to direct the gas through the grill gas line 38 and to the grill assembly 27. Next, the user engages the main infrared burner control knob 65 which communicates with the main infrared burner control valve 64 to allow gas to flow to the main infrared burner 61, and further engages the grill ignition switch 16 to light the main infrared burner 61. The user is then able to control the intensity of the heat produced by the main infrared burner 61 by further engaging the main infrared burner control knob 65.

Figure 8:
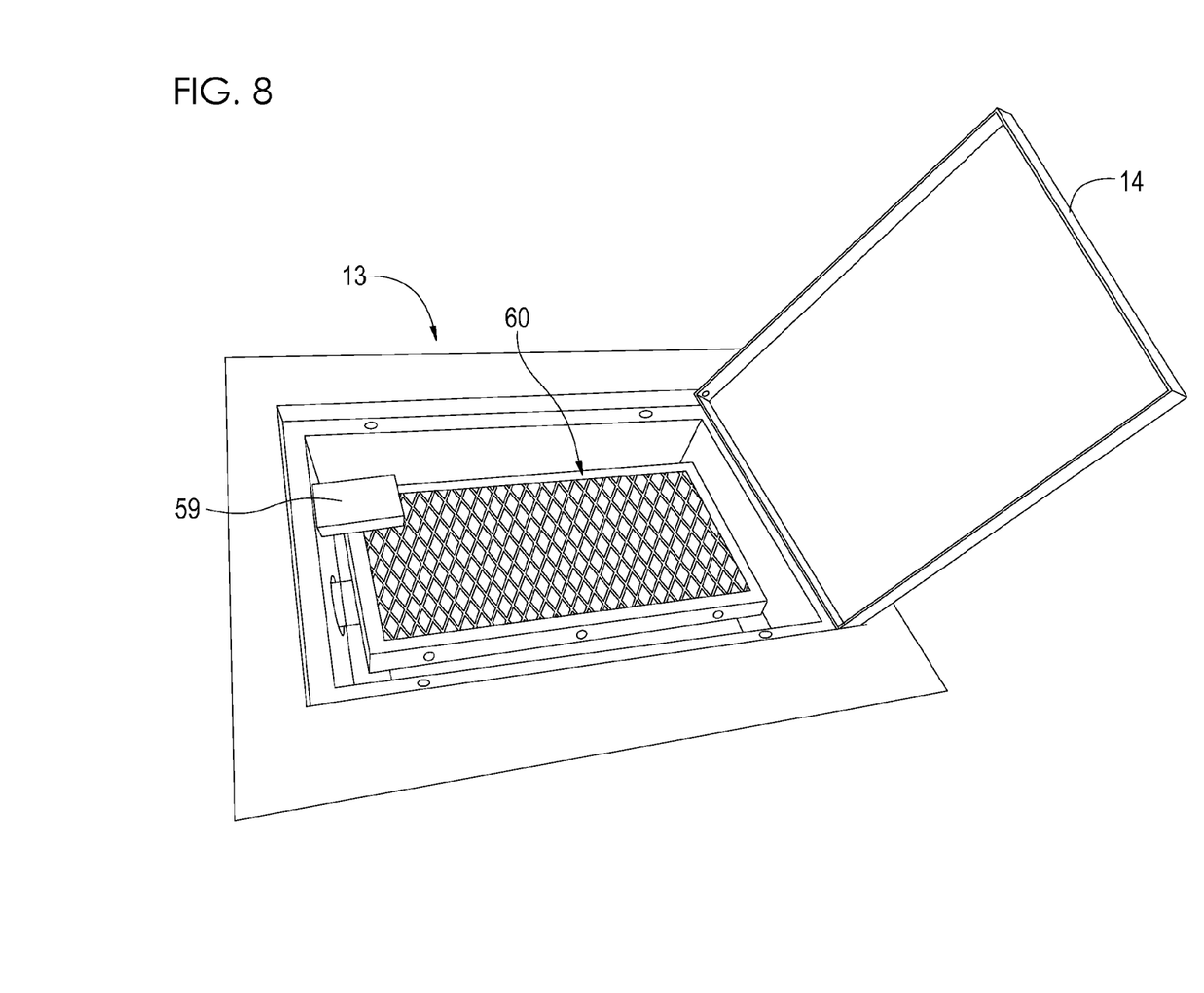
FIG. 8 is a view of the side infrared burner of the grill fireplace unit in accordance with an embodiment of the present invention wherein the side rack has been removed.

One or more of the cabinets 17 may also comprise a side burner assembly 13, as best shown in FIGS. 5 and 8, that provides an additional or alternative cooking surface from the grill assembly 27. The side burner assembly 13 comprises a side burner lid 14 which when open allows access to the side rack 25. When the side burner lid 14 is closed, it protects the infrared burner 60, and also functions as an additional work top 52. Underneath the side rack 25 is a side infrared burner 60. The side infrared burner 60 of the present invention comprises an igniter 59, such as a piezo electric igniter, connected to the grill ignition switch 16. The side infrared burner 60 is connected to a side infrared burner control valve 62, and is in communication with and controlled by a side infrared burner control knob 63. The side infrared burner control valve 62 may be a standard manual gas control valve.

To operate the side infrared burner 60, and as best illustrated in the schematic of FIG. 9, the user first engages the regulator 53 to allow gas to flow through the main gas line 50. The user then engages the directional gas control knob 36 that communicates with the directional valve 37 to direct gas through the grill gas line 38 to the side burner assembly 13. Next, the user engages the side infrared burner control knob 62 which communicates with the side infrared burner control valve 63 to allow gas to flow to the side infrared burner 60, and further engages the grill ignition switch 16 to light on the side infrared burner 60. The user is then able to control the intensity of the heat produced by the side infrared burner 60 by further engaging the side infrared burner control knob 63. The main infrared burner 61, the side infrared burner 60 and the burner arms 57 may be used independently of each other or at the same time as each other.

Figure 6:
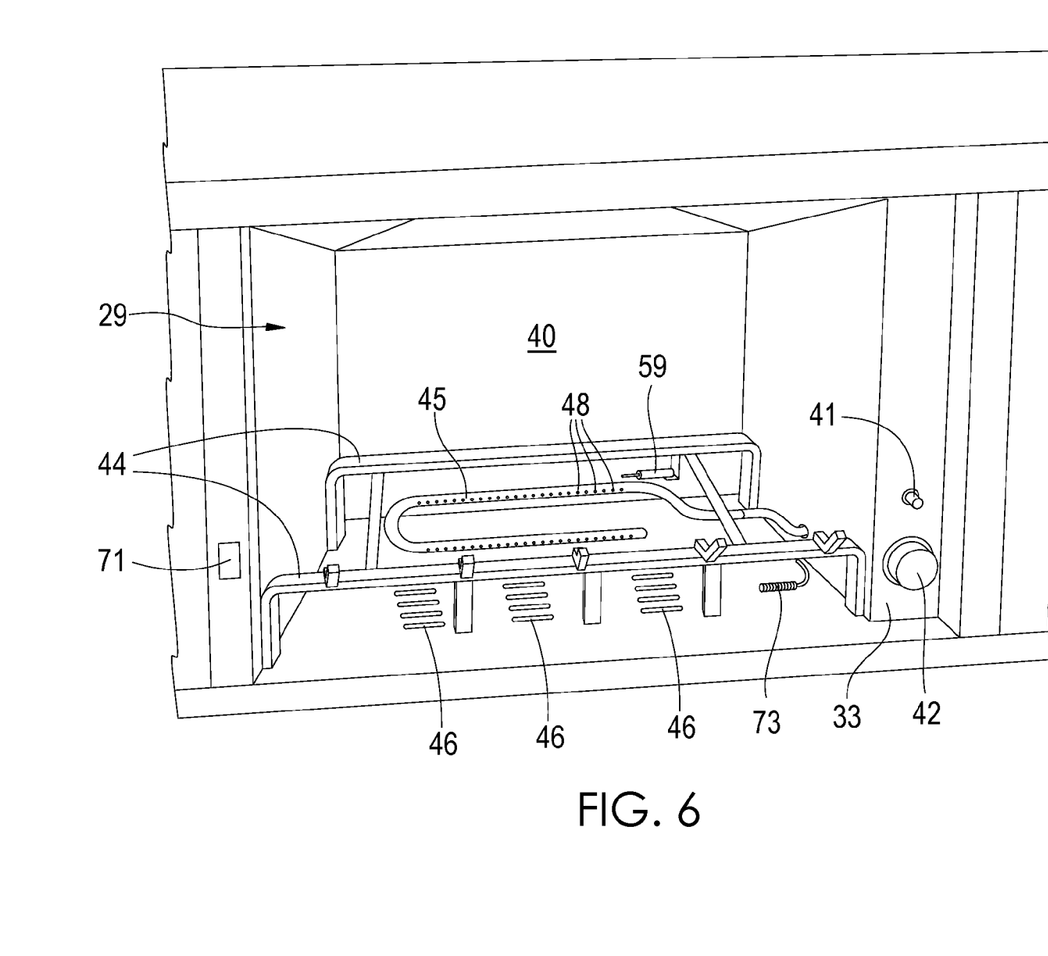
FIG. 6 is a view of the fireplace interior of the grill fireplace unit in accordance with an embodiment of the present invention wherein the logs have been removed.

Below the grill assembly 27 is the fireplace assembly 29. As best seen in FIGS. 4 and 6, the fireplace assembly 29 comprises fireplace doors 18, a fireplace surround 33 and a fireplace interior 40. The fireplace doors 18 are capable of concealing the fireplace interior 40 when the fireplace assembly 29 is not in use. When open, the fireplace doors 18 may be held open using magnets. The fireplace surround 33 includes a fireplace ignition switch 41 and a fireplace control knob 42. In an alternate embodiment the fireplace ignition switch 41 and the fireplace control knob 42 may be located above or near the cabinets 17. The fireplace interior 40 is insulated with rockwool insulation, or any other type of fire safe insulation, to reduce the conduction of heat from the fire within the fireplace interior 40 to other parts of the grill fireplace unit 10. The fireplace interior 40 and the interior of the fireplace doors 18 may also comprise a faux stone finish to provide additional aesthetic appeal to the fireplace assembly 29.

Located at the bottom of the fireplace interior 40 is a burner tube 45, comprising a plurality of spaced apertures 48, that is connected a fireplace control valve 49 which is in communication with and controlled by the fireplace control knob 42. The fireplace control valve 49 may be a standard manual gas control valve. Alternatively, the fireplace control valve may be controlled by a remote control or a manual key. The burner tube 45 also comprises an igniter 59, such as a piezo electric igniter, wherein the igniter 59 is controlled by the fireplace ignition switch 41. The fireplace control valve 49 is further connected to a fireplace gas line 47. Above the burner tube 45 is a log support 44, and resting on the log support 44 are logs 43. The logs 43, common in gas fireplaces, are made of materials suitable to withstand heat and flames, such as, but not limited to ceramic or rockwool. In an alternate embodiment, the fireplace interior 40 may be used to house real wood logs or an electric fireplace.

As best seen in FIG. 3, the fireplace interior 40 may also include a fireplace exhaust 31 near the top rear of the fireplace interior 40. The fireplace exhaust 31 allows hot air, which rises naturally, to be directed out of the fireplace interior 40, towards the rear of the grill fireplace unit 10 and away from the user of the grill fireplace unit 10. As seen in FIG. 6, the fireplace interior 40 also includes bottom fireplace vents 46 to allow heat and moisture to escape.

Figure 3A:
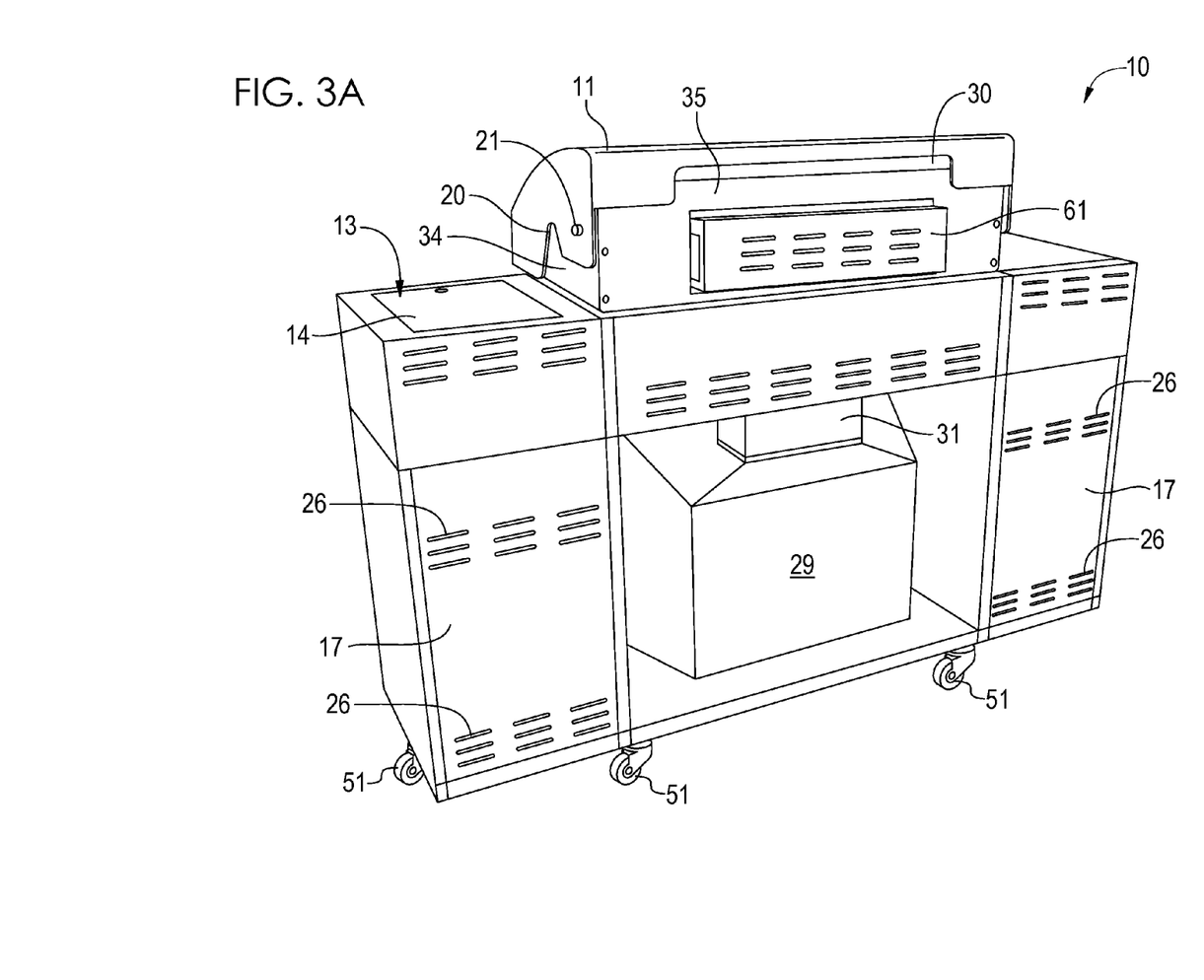
FIG. 3A is a rear view of an alternate embodiment of the grill fireplace unit of the present invention wherein the exhaust connects to the grill base.

In an alternative embodiment, as shown in FIG. 3A, the fireplace exhaust 31 can extend upwards so that it vents the hot air from the fireplace assembly 29 into the grill assembly 27. This embodiment is advantageous in that I speculate that it would allow the user to warm or slow-cook food in the grill assembly 27 using the hot air from the fireplace assembly 29. In this embodiment, the fireplace exhaust 31 may additionally include a hinged or rotatable exhaust cover, so that when in an initial position, the exhaust cover causes the fireplace exhaust 31 to direct air into the grill assembly 27. However, when the exhaust cover is in a second position, it causes the fireplace exhaust to direct air towards the rear of the fireplace unit.

To operate the fireplace assembly 29, and as best illustrated in the schematic of FIG. 9, the user first engages the regulator 53 of the gas tank 54 or the residential natural gas line to allow gas to flow through the main gas line 50. The user then engages the directional gas control knob 36 that communicates with the directional valve 37 to direct gas through the fireplace gas line 47 to the fireplace assembly 29. Next, the user engages the fireplace control knob 42 which communicates with the fireplace control valve 49 to allow gas to flow to the burner tube 45, and then engages the fireplace ignition switch 41 to activate the igniter 59 which results in the production of flames extending from the apertures 48 of the burner tube 45. The user is then able to control the intensity of the flame extending from the burner tube 45 by further engaging the fireplace control knob 42.

At least one of the fireplace doors 18 may optionally comprise a shut-off switch 71 to prevent the fireplace assembly 29 from being used when the fireplace doors 18 are closed. An at least one shut-off switch 71 may be located within the fireplace assembly 29, specifically on the fireplace surround 33 as illustrated in FIG. 5, so that it is activated when at least one of the fireplace doors is closed. The shut-off switch 71 is connected to and controlled by the fireplace control valve 49, and when activated communicates with the fireplace control valve 49 to close the fireplace control valve 49 and prevent gas from further flowing to the burner tube 45.

Alternatively, or in addition to the shut-off switch, the fireplace assembly 29 may comprise a thermocouple 73 within the fireplace interior 40 near the burner tube 45, as illustrated in FIG. 6. The use of thermocouples, such as thermocouple 73, is well known in the field as a safety shutoff device. When the thermocouple 73 senses that the fireplace interior 40 exceeded a pre-determined temperature, it communicates with the fireplace control valve 49 to prevent gas from flowing to the burner tube 45. The thermocouple 73 may alternatively be used in conjunction with a pilot light, wherein when the thermocouple 73 sense the fireplace interior 40 has exceeded a pre-determined temperature or the pilot light has been extinguished, it communicates with the fireplace control valve 49 to close the fireplace control valve 49 and to prevent gas from further flowing to the burner tube 45.

The hood assembly 32, grill assembly 27, fireplace assembly 29, worktop 52 and cabinets 17 may be constructed from any rigid fire-resistant material, and are preferably made from a metal, such as steel or aluminum, or tempered glass. The grill fireplace unit 10 also includes wheels 51 secured to the bottom of the fireplace assembly 29 and/or cabinets 17 wherein the wheels allow the grill fireplace unit 10 to be rolled to the user's desired location.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

That which is claimed is:

1. A unit for cooking or creating a fire comprising;
a means for cooking; and
a means for creating an open fire;
a means for preventing said means for cooking or said means for creating an open fire from operating at the same time;
a means for containing heat near said means for cooking; and
a means for directing hot air away from said means for creating an open fire;
wherein said means for creating an open fire is located below said means for cooking;
wherein said means for containing heat is located above said means for cooking;
wherein said means for cooking and said means for creating an open fire can each be used independently; and
wherein said means for directing hot hair away from said means for creating an open fire directs air into said means for cooking.

2. A grill fireplace unit comprising:
a grill assembly;
a fireplace assembly;
a hood assembly;
at least two heat sources;
a gas control valve;
a gas control knob;
wherein said grill assembly comprises:
a grill base;
a main rack;
a burner arm;
a grill ignition switch; and
a grill igniter;
wherein said main rack is above the grill base;
wherein said burner arm is disposed within said grill base;
wherein said grill igniter is connected to said burner arm; and
wherein said grill igniter is connected to and controlled by said grill ignition switch;
wherein said fireplace assembly comprises:
a fireplace interior;
a fireplace surrounding bordering said fireplace interior;
a fireplace door capable of concealing said fireplace interior;
a fireplace exhaust capable of directing air out of said fireplace interior;
a burner tube disposed within said fireplace interior;
a fireplace igniter;
a fireplace ignition switch;
a fireplace control valve;
a fireplace control knob;
a log support;
at least one log;
wherein said fireplace igniter is connected to and controlled by said fireplace ignition switch;
wherein said burner tube is connected to said fireplace control valve;
wherein said fireplace control valve is connected to and controlled by said fireplace control knob wherein said log support is located above said burner tube;
wherein said logs rest on said log support;
wherein said hood assembly comprises:
a hood back;
a first hood side;
a second hood side; and
a hood top;
wherein said hood back is connected to said first hood side and said second hood side;
wherein said hood top is pivotally connected to said first hood side and said second hood side;
wherein said fireplace assembly is disposed below said grill assembly;
wherein one said heat source is used by the grill assembly and the second said heat source is used by the fireplace assembly;
wherein said gas control valve is connected to said burner arm;
wherein said gas control valve is connected to and controlled by said gas control knob;
wherein said hood assembly is disposed above said grill assembly;
wherein said fireplace door comprises a shut-off switch to prevent use of said fireplace assembly when said fireplace door is closed; and
wherein said fireplace exhaust directs air from said fireplace interior into said grill base.

* * * * *